March 13, 1956 B. NIEDERMAN 2,738,466

METHOD OF CONSTRUCTING AN ELECTRICAL FILTER

Filed April 13, 1950 3 Sheets-Sheet 1

INVENTOR.
Bernard Niederman,
BY
Norman L. Mueller
Atty.

March 13, 1956 B. NIEDERMAN 2,738,466

METHOD OF CONSTRUCTING AN ELECTRICAL FILTER

Filed April 13, 1950 3 Sheets-Sheet 2

INVENTOR.
Bernard Niederman,
BY
Foorman L. Mueller
Atty.

March 13, 1956 B. NIEDERMAN 2,738,466

METHOD OF CONSTRUCTING AN ELECTRICAL FILTER

Filed April 13, 1950 3 Sheets-Sheet 3

INVENTOR.
Bernard Niederman,
BY
Foorman L. Mueller
Atty.

United States Patent Office 2,738,466

Patented Mar. 13, 1956

2,738,466

METHOD OF CONSTRUCTING AN ELECTRICAL FILTER

Bernard Niederman, Chicago, Ill., assignor to Motorola, Inc., Chicago, Ill., a corporation of Illinois Application April 13, 1950, Serial No. 155,683

3 Claims. (Cl. 333—70)

This invention relates generally to electrical filter circuits, and more particularly to means for sealing an electrical wave filter and thereby fixing the characteristics thereof.

Electrical filter circuits of a great number of different types have been used for a considerable number of years. It is known that filter sections having various predetermined characteristics can be combined to provide filters operating at various frequencies and having various characteristics as to the selectivity and the pass band thereof. The present invention is directed to a highly selective band pass filter for use in a radio receiver to provide very high selectivity therein. A radio receiver using such a filter is disclosed in the application of Henry Magnuski, Serial No. 16,575, filed March 23, 1948, now Patent No. 2,608,648, subject Highly Selective Radio Receiver.

Although the characteristics of various types of filter sections are known as set forth above, a great deal of difficulty has been encountered in providing a filter structure having the desired characteristics and which may be provided as a compact and inexpensive unit. Further, the electrical characteristics of the various elements of such filter circuits are subject to variations due to heat, humidity, vibration, aging, etc., so that the characteristics of such a filter may not remain fixed over a long period of time. This requires adjustment of the filter and causes improper operation when the adjustment is not carefully maintained.

It is therefore an object of the present invention to provide an improved compact electrical band pass filter having very high selectivity and a predetermined fixed bandwidth.

Another object of this invention is to provide a filter, the overall characteristics of which are not substantially affected by heat, humidity, fungus, vibration or aging.

A further object of the invention is to provide an improved filter structure in which the adjustment remains fixed and substantially no maintenance is required.

A still further object of this invention is to provide an improved method of constructing a highly selective electrical filter structure.

A feature of this invention is the provision of a filter provided in a sealed container so that the characteristics of the filter are accurate and are not substantially affected by heat, humidity or fungus.

A further feature of this invention is the provision of a filter structure having the components thereof embedded in plastic material so that relative movement of the components or parts thereof is prevented and the characteristics of the filter are not changed due to vibration or long use. The sealing of the filter also prevents unauthorized tampering therewith.

Another feature of this invention is the provision of a filter which is mechanically sealed and in which the effects of the sealing material on the filter characteristics is compensated for by the electrical design of the filter. The values of certain components may also be adjustable to further compensate for the effect of the sealing material thereon. This latter adjustment may be accomplished by the improved method in which the filter components are adjusted after the filter is partially sealed, with the components then being completely sealed to prevent further adjustment.

Still another feature of this invention is the provision of a filter, and a container therefor having a plurality of interconnected portions, with plastic sealing material being applied to the filter to provide a seal about the components thereof and to seal the junctions between the various portions of the container.

Further objects and features, and many advantages of the invention will be apparent from a consideration of the following description when taken in connection with the accompanying drawings in which.

In practicing the invention there is provided a filter structure including circuit components interconnected to make up a plurality of filter sections. The components are provided in a container having a plurality of mechanically joined portions. Plastic sealing material is provided in the container for sealing the joints between the portions thereof, and flows about the circuit components for sealing the same and fixing the positions thereof. The plastic material may be provided in all the vacant spaces in and about the components if desired to completely fix the position of the components and all portions thereof. The sealing material may be applied in two steps, with the first step partially sealing the components but permitting adjustment thereof before the sealing material is set, and the second step completely covering the components to fix the position and adjustment thereof. The filter circuit may be so designed that the effect of the increased capacity and the dielectric loss, resulting from the plastic sealing material, is more easily compensated for, and the values of the components may be adjusted in advance to provide the desired characteristics. The invention may also be practiced by individually sealing the various components of a filter and interconnecting a plurality of the individually sealed components to provide a complete filter circuit.

Figure 1:
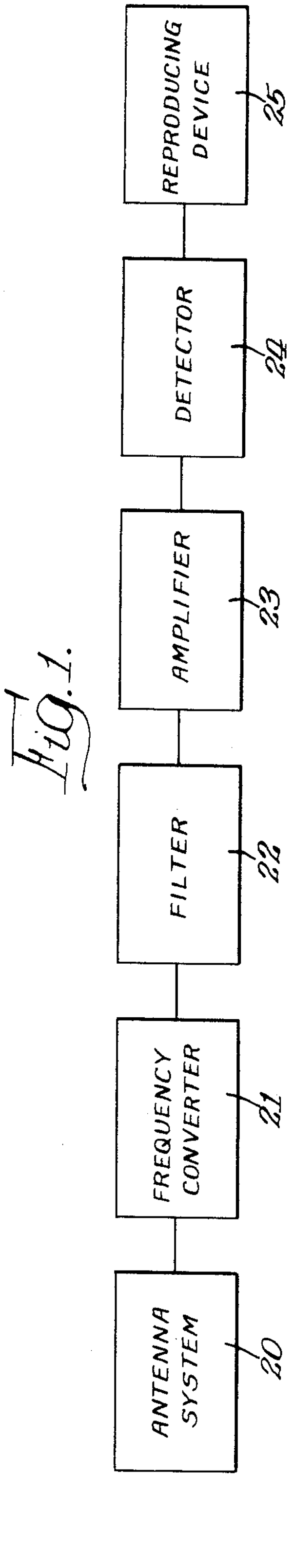
Fig. 1 is a block diagram of an electronic receiver utilizing the filter in accordance with the invention.

Referring now to the drawings, in Fig. 1 there is shown in block diagram a circuit for an electronic receiver which may be of any one of a plurality of different kinds. For example, the receiver may be an amplitude modulated or a frequency modulated radio receiver for receiving sounds, or a television receiver or a receiver for any other type of signal. The receiver includes an antenna system 20 for intercepting and selecting a carrier wave of a predetermined frequency and a frequency converter 21 for reducing the frequency of the received wave to an intermediate frequency wave. The converter may provide one or more stages of frequency conversion. The intermediate frequency wave is selected in the filter 22 which is a highly selective band pass filter in accordance with the invention. The selected wave is then amplified by amplifier 23, with the modulating signal being derived in the detector 24 and reproduced in the reproducing device 25. Although the characteristics of each of these elements will be different depending upon the application of the receiving system, certain characteristics are desired in the filter 22 for all of these various applications and the invention is directed to a filter having these characteristics. More specifically, this filter should have a predetermined fixed bandwidth with very high selectivity at the edges of the band. Further the filter should be of such construction that these characteristics will remain constant and will not be effected by temperature, humidity, fungus, vibration or aging, so that adjustment or maintenance of the filter will not be required.

Figures 2, 3:
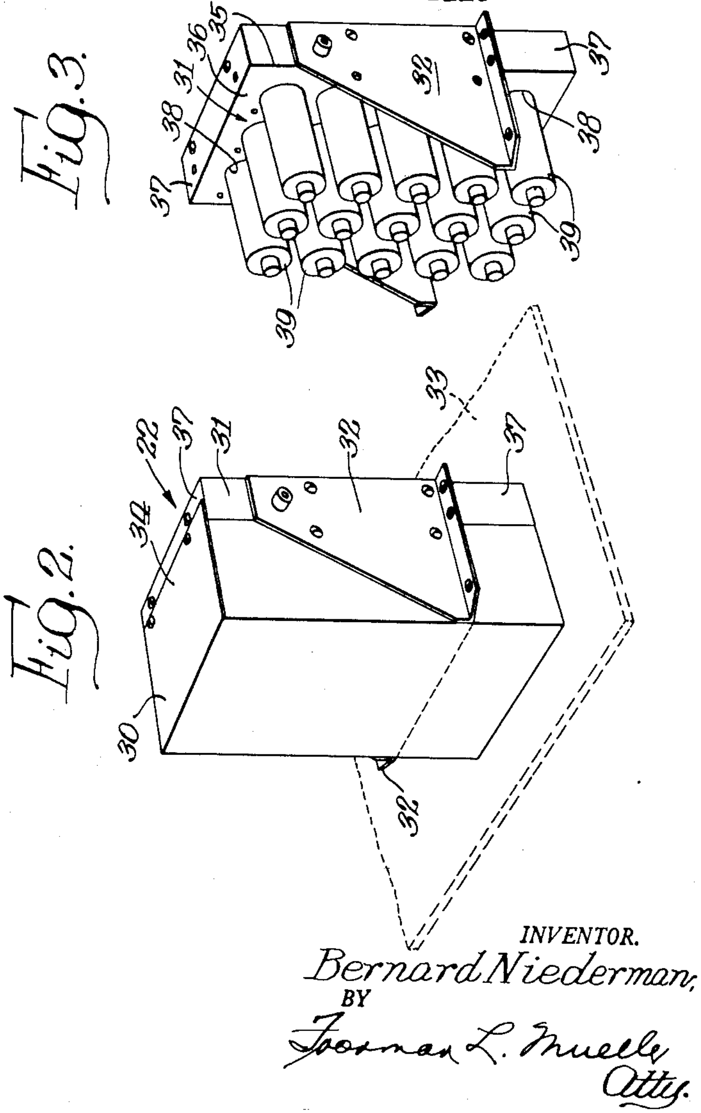
Fig. 2 is a perspective view of the completely enclosed filter structure.
Fig. 3 illustrates the filter with the outer cover removed.
Figures 5, 7:
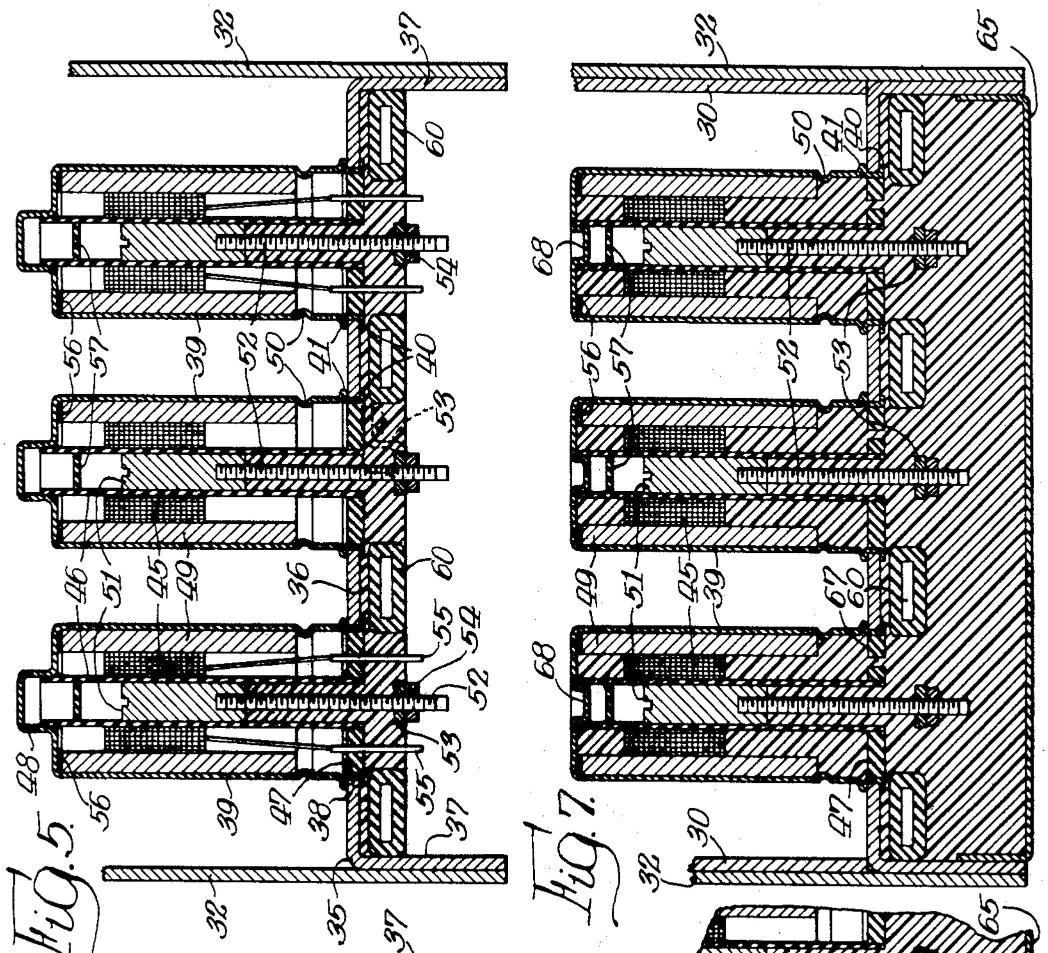
Fig. 5 is a cross-sectional view showing a partly sealed filter.
Fig. 7 is a cross-sectional view of a modified filter structure.
Figure 6:
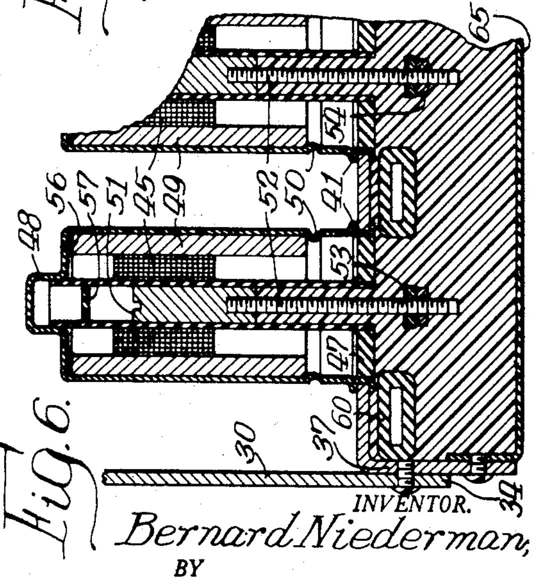
Fig. 6 is a cross-sectional view of the filter of Fig. 5 after the sealing operation is completed.
Figures 8, 9, 10, 11:
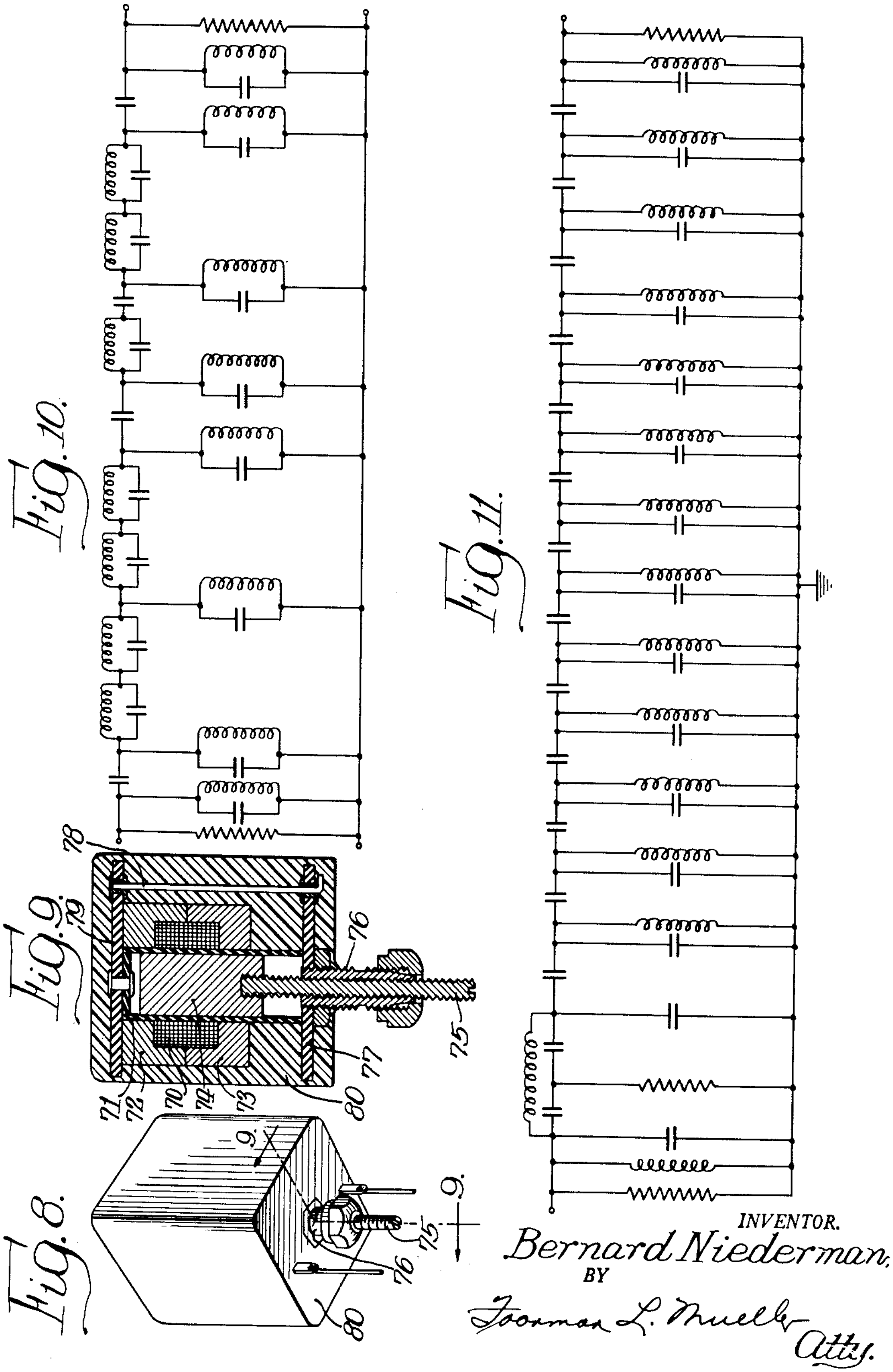
Figs. 8 and 9 illustrate individually sealed units.
Figs. 10 and 11 are circuit diagrams of representative filter circuits.

Figs. 2 to 6 illustrate the physical construction of one embodiment of the invention and this construction may be applied to various filter circuits as for example the filter circuits illustrated in Figs. 10 and 11. Fig. 2 shows the filter 22 with the outer cover 30 secured to the main container or chassis 31 for the filter, and the brackets 32 for supporting the filter on a receiver chassis 33. Fig. 3 shows the structure with the outer cover 30 removed, showing the structure of the container 31 which directly supports and contains the filter unit. The container 31 includes a chassis member 35 having a flat portion 36 and rim portions 37 extending around the edge of the flat portion 36 on one side thereof to provide a recess on the one side. Openings 38 are provided in the flat portion in which the open ends of cans 39 are secured. The construction of the chassis member 35 and the cans 39 are best shown in Figs. 5 and 6 with the cans 39 having spaced annular ribs 40 and 41 formed thereon to engage the sides of the chassis about the openings 38 to thereby join the cans and chassis. The cover 30 (Figs. 2 and 6) is flush with the rim 37 on the sides and overlaps the rim at the top and bottom. The cover is secured to the container by screws engaging the brackets 32 on the sides and by screws in the overlapping ends 34 of the cover at the top and bottom, which screws engage the rim portions 37 at the top and bottom of the container.

As is apparent from Figs. 10 and 11, the filter circuits involved are formed of coil units, condensers, resistors and interconnections therefor. The coil units or inductors are provided in the cans 39 with a single unit being provided in each can. The coil units are small so that the entire filter may be compact. As clearly shown in Figs. 5 and 6, each unit includes a coil 45 formed of a plurality of turns of wire supported on an insulating form 46. The insulating form is supported by an end member 47 at the open end of the can 39, and extends partly into a recess 48 at the closed end of the can. Although the cans are illustrated as closed, it is apparent that the recessed ends of the cans may be open. Surrounding the coil is a cylindrical magnetic member 49 which extends from the closed end of the can to a groove 50 formed near the open end of the can. A spring washer 56 holds the cylindrical member 49 firmly in place. Supported for sliding movement within the insulating form 46 is a magnetic core 51. A threaded rod 52 is secured to the core 51 at one end and is threaded in a bracket 53 secured to the flat portion 36 of the chassis 35. A lock nut 54 is also provided on the threaded rod 52. A plug 57 is provided in the coil form 46 to prevent the sealing material from entering the top end of the form. Terminals 55 are provided in the end member 47 for making connection to the coil 45 from the underside of the chassis.

Figure 4:
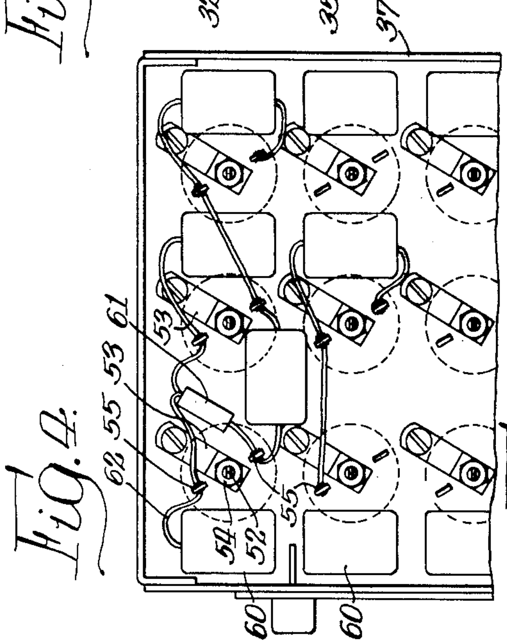
Fig. 4 is a bottom view of a portion of the filter structure.

Fig. 4 illustrates the underside of the chassis and shows the condensers 60 and a resistor 61 positioned directly underneath the flat portion of the chassis. The condensers and resistor are interconnected to each other and to the terminals 55 of the coil unit by conductors 62. The condensers and resistor may be supported entirely by the various connections to the terminals 55. As previously stated, various circuit arrangements may be used and therefore different connections may be provided between the elements of the filter, within the teaching of the invention.

After the various elements of the circuit are provided in the container and interconnected, plastic material in a liquid state is provided in the recess formed in the chassis. This material flows into the insulating coil forms 46 about the threaded rods 52, and also completely surrounds the condensers, resistor and the conductors connected thereto. This plastic material when it sets fixes the threaded rods 52 so that they cannot be further adjusted, seals the junction between the cans 39 and the chassis 35, and secures the condensers, resistor, and conductors in place on the underside of the chassis.

In constructing the device, after the recess is partly filled as shown in Fig. 5, and before the plastic material completely sets, the filter may be tested and the cores 51 may be adjusted by rotating the rods 52 to provide the desired characteristics. This adjustment, after the plastic material is provided in the container, may be desirable because the plastic material has a dielectric constant greater than one to thereby increase the distributed capacity of the filter circuit. Furthermore, the plastic material introduces dielectric loss to thereby reduce the Q of the circuit. By providing adjustment after the container is partly filled with plastic material, it is possible to compensate for these changes in the characteristics resulting from the introduction of the plastic material and provide the desired overall filter characteristics.

After the adjustment has been made and the plastic material has set, the recess in the chassis member may be completely filled with plastic material and a closure plate 65 secured to the rim portions 37 as shown in Fig. 6. It is not essential that the space between the chassis member and the closure plate 65 be absolutely full of plastic material, but it is desirable that it be full around the edges so that the plastic material will form a seal between the closure plate 65 and the chassis member 35.

In Fig. 7 there is illustrated a slightly modified structure in which the plastic material completely fills the space within the cans 39. This structure may be provided by first filling the cans with fluid plastic material and then immersing the coil unit therein. Openings 67 are provided in the end members 47 so that the plastic material can flow from the space within the cans 39. The plastic material therefore completely surrounds the coil 45 and the magnetic sleeve 49. The construction of the cam 39 shown in Fig. 7 is slightly different than that of Figs. 5 and 6, with the cans having an indentation 68 at the closed end thereof for holding the coil form 46, instead of having a recess. Also, the cans and the magnetic sleeves may be somewhat shorter in the structure of Fig. 7. The construction of Fig. 7 has the advantage that the coil 45 is completely impregnated by the plastic material, and the various turns thereof are embedded in the plastic so that the position is fixed and cannot be changed due to vibration or other conditions to cause the inductance thereof to change. In other respects, the structure of Fig. 7 may be identical to that of Figs. 5 and 6 and it is obvious that this structure can be used with various filter circuit connections as desired.

In Figs. 8 and 9, there is disclosed an alternative construction in which coil units are individually provided in a block of plastic material to fix the characterstics thereof. Such coil units may be connected in a filter circuit and the characteristics of the coil will remain fixed to thereby fix to a great extent the characteristics of the entire filter. In this construction a coil 70 is provided on a form 71. Complementary annular members 72 and 73 form a magnetic shell about the coil. Supported within the form 71 is a core 74 which is secured to a threaded rod 75 supported in a threaded sleeve 76 secured to the end plate 77. The structure is held in assembled relation by rods 78 interconnecting the end plate 77 and the top end plate 79. This entire structure is molded in a plastic block 80 so that the entire structure is thereby impregnated and sealed.

Figure 12:
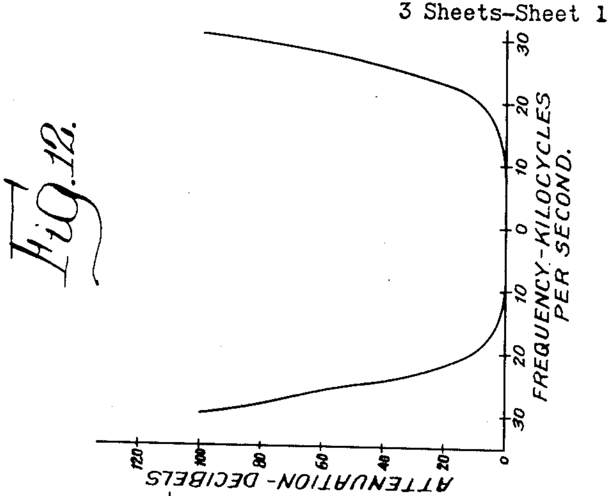
Fig. 12 shows the selectivity curve of a filter circuit such as illustrated in Figs. 10 and 11.

The filter constructions shown are adaptable for use with filters in which various circuit arrangements are provided. Examples of such circuits are shown in Figs. 10 and 11. As previously stated, the plastic material increases the dielectric constant of the space within the container so that the distributed capacity throughout the circuit is increased and the dielectric loss is increased. As previously stated, the filter may be adjusted after the structure is partly sealed, to compensate for the change in characteristics resulting from the plastic material. However, as the general nature of the changes resulting from the plastic material is known, the values may be preadjusted so that after the plastic material is added, the filter will have the desired characteristics. Such a procedure will make it possible to eliminate the intermediate adjusting step, at least in certain applications. It has been found that by using filter circuits including a plurality of shunt type sections in which the coils are bridged by condensers connected to ground, it is easier to compensate for the changes in characteristics due to the insertion of the plastic material. This is because the plastic material increases the capacity to ground and this can be directly compensated for by reducing the value of the bridging condenser. For this reason, circuits such as shown in Fig. 11 may be preferred so that the filter may be sealed in a single step without an intermediate adjustment. The bandwidth and selectivity characteristics of filters such as shown in Figs. 10 and 11 is illustrated in Fig. 12.

Although various plastic materials may be used for sealing the filter, it is found that polyester-styrene resin is particularly suitable. This material is completely impregnable to moisture and fungus and is a good heat conductor. The material is very tough and when properly treated will not crack or break due to vibration and after being subject to long periods of use. The use of a filler in the plastic material, such as silica flour, in addition to reducing shrinkage of the plastic material when it sets, also improves the resistance thereof to damage due to vibration, and improves the heat conductivity thereof. The sealing material therefore not only positively anchors the components of the filter and seals the same from moisture or other foreign matter, but also provides a positive seal between various portions of the container to provide a completely sealed container structure.

It will be apparent from the foregoing that there is provided a structure in which filter components are supported and sealed so that the overall characteristics of the filter will remain fixed. A method of sealing the filter is provided in which adjustment is possible before final sealing to compensate for the effect of the sealing material on the electrical characteristics, so that the desired characteristics are provided. The structure and method result in a filter having precisely the desired characteristics in a relatively inexpensive and compact unit. The units constructed in accordance with the invention have been found to be highly satisfactory and greatly superior to filters of prior construction.

Although there are disclosed several embodiments of the invention which are illustrative thereof, it is obvious that changes and modifications can be made therein without departing from the intended scope of the invention as defined in the appended claims.

I claim:

1. The method of constructing an electrical filter which includes a container structure having a plurality of cup-shaped portions with open ends, and a plurality of circuit elements in the container structure including condensers and coils connected to form filter sections and coupling elements interconnecting said sections to form a filter network, said coils having turns of wire and cores adjustable therein, said method including the steps of, providing plastic material having a liquid state and a solid state in which the plastic material is rigid, introducing plastic material in the liquid state into the cup-shaped portions, placing said coils in said cup-shaped portions with said cores being accessible from the open ends of said cup-shaped portions and with the plastic material flowing about the coils and engaging the wire turns thereof to thereby restrain movement of said wire turns, said plastic material affecting the electric characteristics of the filter, electrically testing the filter network to determine the electrical characteristics thereof, mechanically adjusting the position of the core of at least one coil while testing said filter and continuing such adjustment until the testing indicates that the filter has predetermined electrical characteristics, pouring additional plastic material in the liquid state in the container structure with the plastic material engaging said cores, covering the open ends of the cup-shaped container portions, and surrounding said coupling elements, and allowing said plastic material to solidify to fix the positions of said elements and the positions of said cores, the said electrical characteristics of the filter being fixed by the rigid solid plastic material and the mechanical characteristics of the filter likewise being fixed thereby.

2. The method of constructing an electrical filter which includes a container structure having a plurality of cup-shaped portions with open ends, and a plurality of circuit elements in the container structure including condensers and coils connected in parallel to form filter sections having one side thereof connected to said container structure, said circuit elements including coupling means interconnecting the other sides of said sections to form a filter network, said coils having turns of wire and cores adjustable therein, said method including the steps of, providing plastic material having a liquid state and a solid state in which the plastic material is rigid, introducing plastic material in the liquid state into the cup-shaped portions, placing said coils in the cup-shaped portions with said cores being accessible from the open ends of said cup-shaped portions and with the plastic material flowing about the coils and engaging the wire turns thereof to thereby restrain movement of said wire turns, said plastic material affecting the electric characteristics of the filter, electrically testing the filter network to determine the electrical characteristics thereof, mechanically adjusting the position of the core of at least one coil while testing said filter and continuing such adjustment until the testing indicates that the filter has predetermined electrical characteristics, pouring additional plastic material in the liquid state in the container structure with the plastic material engaging said cores, and allowing said plastic material to solidify to fix the positions of said cores, said solid plastic material completely surrounding said circuit elements so that the electrical characteristics of the filter and the mechanical characteristics thereof are fixed by said rigid solid plastic material.

3. The method of constructing an electrical filter which includes a container structure having a plurality of cup-shaped portions with open ends, and a plurality of circuit elements in the container structure including condensers and coils connected in parallel to form filter sections having one side thereof connected to said container structure, said circuit elements including coupling means interconnecting the other sides of said sections to form a filter network, said coils having turns of wire and cores adjustable therein, said method including the steps of, providing plastic material including polyester styrene resin and a silica filler which material has a liquid state and a solid state in which the plastic material is rigid, introducing the plastic material in the liquid state into the cup-shaped portions, placing said coils in the cup-shaped portions with said cores being accessible from the open ends of said cup-shaped portions and with the plastic material flowing about the coils and engaging the wire turns thereof to thereby restrain movement of said wire turns, said plastic material affecting the electric characteristics of the filter, electrically testing the filter network to determine the electrical characteristics thereof, mechanically adjusting the position of the core of at least one coil while testing said filter and continuing such adjustment until the testing indicates that the filter has predetermined electrical characteristics, pouring additional plastic material in the liquid state in the container structure with the plastic material engaging said cores, and allowing said plastic material to solidify to fix the positions of said cores, said solid plastic material covering the open ends of said cup-shaped portions and completely surrounding said circuit elements, the said electrical characteristics of the filter being fixed by the rigid solid plastic material and the mechanical characteristics of the filter likewise being fixed thereby.

References Cited in the file of this patent

UNITED STATES PATENTS

| | | |
|---|---|---|
| 877,089 | Koch | Jan. 21, 1908 |
| 1,315,365 | Hamm | Sept. 9, 1919 |
| 1,597,901 | Kent | Aug. 31, 1926 |
| 1,647,736 | Kollath | Nov. 1, 1927 |
| 1,650,395 | Siegel | Nov. 22, 1927 |
| 1,652,212 | Priess | Dec. 13, 1927 |
| 1,836,260 | Lewis | Dec. 15, 1931 |
| 1,931,043 | Taylor | Oct. 17, 1933 |
| 1,985,042 | Lane | Dec. 18, 1934 |
| 2,180,413 | Harvey | Nov. 21, 1939 |
| 2,304,667 | Taylor | Dec. 8, 1942 |
| 2,391,038 | Rifenbergh | Dec. 18, 1945 |
| 2,434,511 | Osterman | Jan. 13, 1948 |
| 2,443,736 | Kropa | June 22, 1948 |
| 2,464,029 | Ehrman | Mar. 8, 1949 |
| 2,484,215 | Foster | Oct. 11, 1949 |
| 2,559,141 | Williams | July 3, 1951 |

FOREIGN PATENTS

| | | |
|---|---|---|
| 445,936 | Great Britain | Apr. 17, 1936 |
| 540,169 | Great Britain | Oct. 8, 1941 |
| 567,485 | Great Britain | Feb. 15, 1945 |
| 616,240 | Great Britain | Jan. 18, 1949 |

OTHER REFERENCES

National Bureau of Standards Technical News Bulletin, vol. 31, No. 7, July 1947, pp. 78–80. (Copy in Scientific Library.)